United States Patent Office 2,693,813
Patented Nov. 9, 1954

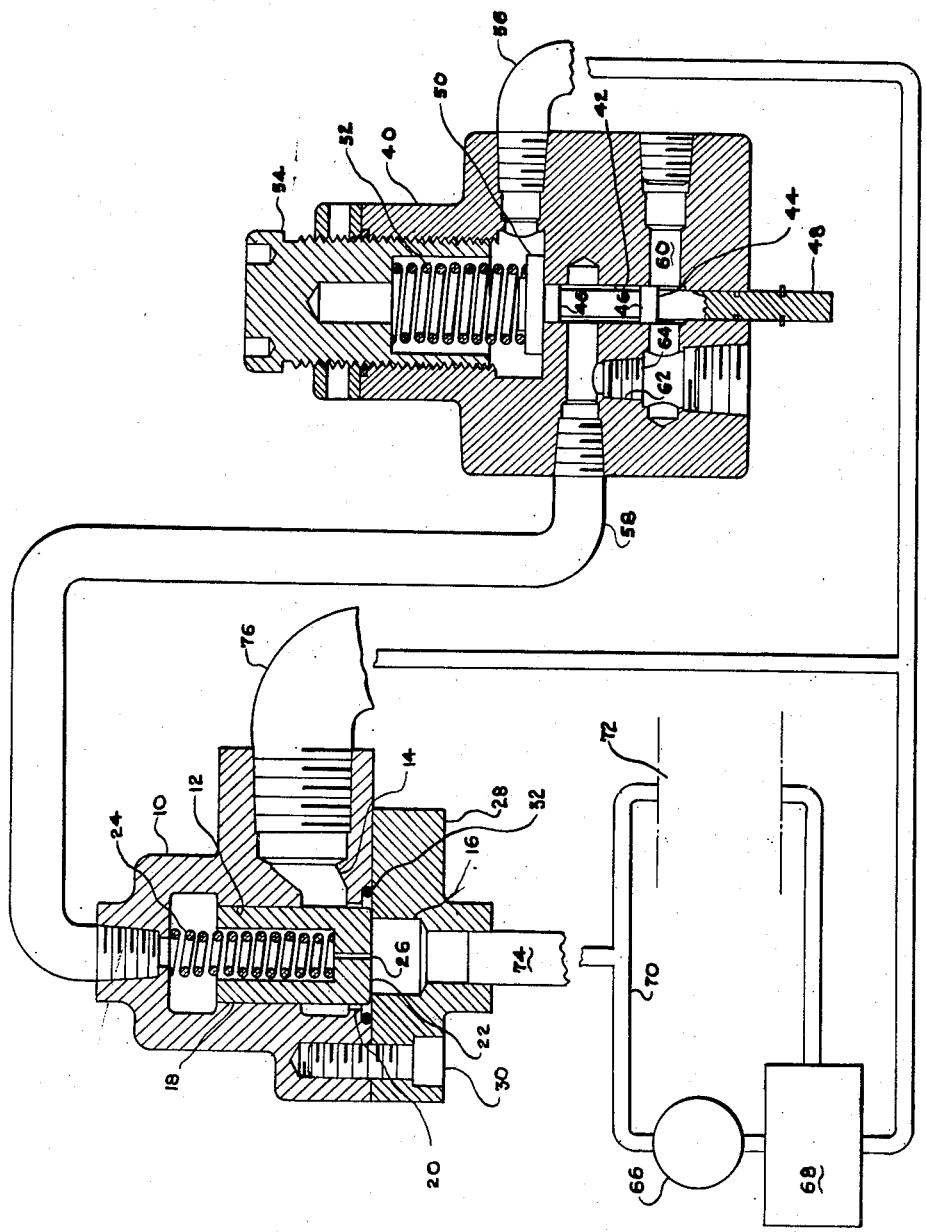
INVENTOR
WARREN R. TUCKER
BY W. S. McDowell
ATTORNEY

2,693,813

COMBINATION PRESSURE RELIEF AND UN-LOADING VALVE FOR HYDRAULIC CIRCUITS

Warren R. Tucker, Mount Gilead, Ohio, assignor to H-P-M Development Corporation, Mount Gilead, Ohio, a corporation of Delaware Application January 13, 1949, Serial No. 70,715

4 Claims. (Cl. 137—269)

This invention relates to hydraulic valves, and particularly to relief valves, unloading valves, and similar flow controlling units.

In modern hydraulic circuits a great number of different types of valves are required, including relief valves, unloading valves, sequencing valves, admission valves, and similar devices.

Most of the aforementioned valves are characterized by having a closed position in which fluid flow is completely blocked and an open position wherein the fluid flow therethrough takes place at low pressure or with little pressure drop taking place through the valve.

The usual type of valve for fulfilling any of the purposes given above has a substantial pressure drop from the inlet to the outlet when in open position and thus represents a source of power loss in the hydraulic circuit.

Since valves of the type described above have a closed position, they generally either have a seat against which a valve member seats, or have a very smoothly finished bore in which a valve plunger slides for controlling the connection between the inlet and outlet ports of the valve.

In either case the machining of the valve body and the valve member is difficult since the surfaces must be accurate in relation to other surfaces and in addition should be very smoothly finished. Especially when a valve seat is embodied in a valve of this nature the machining is difficult because the valve seat is ordinarily remotely located in the valve body and requires special tools or special machines for adequate finishing.

In many of the hydraulic circuits employing valves of the type discussed above the volume of fluid to be controlled is quite large and therefore a large size valve is necessary. If such a valve is to be adjustable in its operating characteristics, the adjustments for the said valve, if embodied directly therein, are quite large and difficult to change.

Furthermore, if the hydraulic circuit is a machine tool circuit or a similar arrangement wherein it is desirable to have the adjustments for the valve readily available to the operator, it becomes highly impractical to position a large valve convenient to the machine operator and at the same time retain a simple and efficient hydraulic circuit.

The object of the present invention is to provide a hydraulic valve which overcomes the foregoing objections to the usual type valve and which may be employed for a plurality of different purposes.

Another object of this invention is to provide a valve so constructed that it can very readily be machined and to within very close limits.

Another object is to provide a valve consisting of a relatively few simple parts and in which different machining operations have been substantially eliminated.

A still further object is the provision of a hydraulic valve which can be positioned in the hydraulic circuit in a manner to provide for the most efficient operation and which may be remotely controlled with regard to its operating characteristics.

It is also an object to provide a hydraulic valve which is pilot controlled from a remote position and in which the pilot operator for the valve may be made responsive to a plurality of stimuli.

These and other objects and advantages will become more apparent upon reference to the following description taken in connection with the accompanying drawing wherein 10 indicates a valve body which has a valve bore machined therein from one side. Opening laterally from the valve bore is an outlet port 14 and opening into the valve bore from the end thereof is an inlet port 16. Slidably mounted within the valve bore 12 is a valve member 18 which is adapted in one position to interrupt communication between the inlet and outlet ports of the valve and in another position to permit communication between ports.

The outlet port 14 is in continuous communication with the open end of the valve bore 12 by virtue of the enlarged part 20 of the said bore adjacent its open end.

It will also be observed that the diameter of the inlet port 16 is substantially less than that of the valve member 18 so that when the said valve member is in the position shown in the drawings, the flat end 22 thereof seats against an annular area surrounding the inlet port and interrupts communication between the said port and the valve bore 12.

A light spring 24 bears between the closed end of the bore 12 and the valve member 18 for continuously urging the latter toward the aforementioned annular seat.

Since the flat end 22 of the valve member is exposed to pressure in the inlet port 16, there is a restricted bore 26 which connects the opposite ends of the valve member together.

The upper end of the valve member has a larger effective area than the lower end thereof when the valve member is closed and thus the said valve member is positively retained in its port disconnecting position.

In order to provide for very simple machine operations in order to produce the valve, the inlet port 16 is formed in an end plate 28 which is secured to the side of the valve body 10 through which the bore 12 opens by cap screws as indicated at 30.

An annular undercut in the face of the valve body 10 receives a resilient sealing ring 32 which prevents leakage from between the end plate 28 and the valve body.

It will be apparent that a highly accurate valve as regards the alignment of the valve member therein with the valve seat can be produced merely by machining the mating faces of the body 10 and the plate 28 flat, by boring the valve bore 12 at right angles to the flat face of the valve body, and by turning the valve member to be cylindrical with a flat end part lying in a plane at right angles to the axis of the cylinder.

It will be apparent that all of the foregoing machining operations can be carried out readily in conventional machines and by conventional methods and still maintain a high degree of accuracy.

For controlling the operation of the valve there is provided a pilot valve comprising a body 40 having a valve bore 42 therein within which is reciprocably mounted a valve member 44 which comprises a pair of spaced spool parts 46 and a stem part 48 extending out the valve body.

The upper end of the valve member has an enlarged part 50 thereon against which bears a spring 52 which has its upper end abutting an adjustable cap 54.

The chamber at the upper end of the pilot valve is vented to exhaust by a conduit 56 and the space between the spool parts 46 is adapted for connection with a pressure source to be exhausted by a conduit 58.

It will be apparent that upward movement of the valve member will interconnect the conduits 56 and 58. The valve member is adapted for being moved upwardly by the projected stem part 48 thereof and is also actuated by pressure conducted to beneath the spool part 46 by the channel means indicated at 60 which may be connected to any suitable pilot pressure source or which may be connected to receive pressure from the conduit 58 by a channel 62 which may be closed by a plug 64.

Depending upon the particular type of service to which the valve is to be put, it may be operated by any of the foregoing means. For illustrating the mode of operation of the main valve part and the pilot valve part they are shown connected with a pump 66 which draws fluid from a reservoir 68 and discharges fluid under pressure through a conduit 70 to a load generally indicated at 72.

The conduit 70 is connected by a conduit 74 with the inlet port 16 of the main valve. As mentioned before, the main valve is normally closed and thus prevents passage of fluid from the inlet port 16 to the outlet port 14 and thence through the conduit 76 to the reservoir 68. However, whenever the pilot valve member 44 is moved upwardly to connect the conduit 58 with the conduit 56, the pressure in the upper end of the main valve is exhausted and the pressure standing in the inlet port 16 moves the valve member 18 upwardly. At that time the pump discharge will be bypassed relatively freely through the conduit 74, inlet port 16, valve bore 12, discharge port 14, and conduit 76 to exhaust.

Inasmuch as the pilot valve may be made responsive to manual actuation, or to actuation by a movable member which comprises a part of the load 72, or to pressure standing in the conduit 58, the main valve may be employed as either a relief valve or an unloading valve.

Furthermore, by directing pressure to beneath the lower spool 46 of the valve member 44 through the channel 60, the said valve member may be moved in response to an auxiliary pilot pressure thereby providing for a pilot type unloader or relief valve.

It will be apparent that the use of this invention is not limited to the particular arrangement shown but that in any situation the movements of the valve member in the main valve will be controlled by controlling the pressure in the upper end of the valve bore.

This invention thus provides for a valve having general utility whereby the stocking of a minimum number of valve parts will provide for the maximum number of different valves, and wherein each of the said valve parts is a simply machined piece which, upon being assembled within the other valve parts, results in a highly accurate valve assembly.

It will be understood that this invention is susceptible to modification in order to adapt it to different usages and conditions and, accordingly, it is desired to comprehend such modifications within this invention as may fall within the scope of the appended claims.

I claim:

1. A combination pressure relief and unloading valve comprising a body formed with a valve bore, an outlet port communicating with the bore, an inlet port, a first channel connecting the inlet port with the valve bore at a point spaced along the latter from the outlet port, a second channel means connecting the inlet port with the valve bore at a point spaced longitudinally of the bore from the first channel, and a third channel means opening at one end exteriorly of said body and communicating at its opposite end with the valve bore at a point spaced therealong from said first channel; a valve member carried in the valve bore of said body and movable therein between positions preventing or permitting communication between the first channel and the outlet port, said valve member being formed with a pressure-responsive area intermediate its ends in communication with the second and third channel means of said body operable in response to fluid pressure introduced within the second and third channel means to urge said valve member to move to its position permitting communication between the first channel and the outlet port of said body, said valve member having an actuating stem thereon extending outwardly of said valve body movable to shift said valve member to a position connecting said first channel and said outlet port independently of said fluid pressure-responsive area; a spring in said body engaging said valve member and urging the latter toward its position preventing communication between the first channel and the outlet port; and means carried by said body for adjusting the tension of said spring.

2. A combination pressure relief and unloading valve as set forth in claim 1, wherein the walls of said body defining the second and third channel means are threaded to receive closure plugs.

3. A combination pressure relief and unloading valve comprising a body formed with a valve chamber, a relatively smaller bore disposed in axial alignment with the valve chamber and forming a continuation thereof, an outlet port communicating with the valve chamber, a fluid inlet port communicating with the smaller bore, a first channel means connecting the fluid inlet port with the bore at a point along the latter spaced from the first point of communication of the inlet port with the bore, and a second channel means opening at one end exteriorly of said body and communicating with the bore at the level of the first channel means; a valve member extending through the smaller bore of said body and terminating at one end in a relatively enlarged region and at its opposite end in a stem projecting outwardly from said body and formed intermediately with a pressure-responsive face communicating with the first and second channel means of said body, said valve member being normally arranged to interrupt communication between the inlet and outlet ports of said body, but being movable in response to forces applied thereto through the pressure-responsive face on the stem thereof to a position permitting communication between the inlet and outlet ports of said body; a spring in said chamber bearing on said valve member and urging the latter toward its normal position interrupting communication between the inlet and outlet ports of said body; and means carried by said body and engaging said spring for varying the tension thereof upon said valve member.

4. A combination pressure relief and unloading valve as set forth in claim 3, wherein the first and second channel means of said body are formed with screw-threaded regions for the reception of closure plugs.

References Cited in the file of this patent

UNITED STATES PATENTS

| Number | Name | Date |
|---|---|---|
| 235,748 | Crisp | Dec. 21, 1880 |
| 591,013 | Schreidt | Oct. 5, 1897 |
| 1,660,382 | Hopkins | Feb. 28, 1928 |
| 2,195,554 | Beardsley | Apr. 2, 1940 |
| 2,200,824 | Herman | May 14, 1940 |
| 2,239,148 | Ernst | Apr. 22, 1941 |
| 2,286,027 | Towler | June 9, 1942 |
| 2,320,011 | Reynolds | May 25, 1943 |
| 2,351,873 | Parker | June 12, 1944 |
| 2,410,375 | Wright | Oct. 29, 1946 |
| 2,411,930 | Marthys | Dec. 3, 1946 |
| 2,496,040 | Criley | Jan. 31, 1950 |